(12) United States Patent
Samy et al.

(10) Patent No.: US 8,694,572 B2
(45) Date of Patent: Apr. 8, 2014

(54) DECIMAL FLOATING-POINT FUSED MULTIPLY-ADD UNIT

(75) Inventors: Rodina Samy, Cairo (EG); Hossam Ali Hassan Fahmy, Cairo (EG); Tarek Eldeeb, Cairo (EG); Ramy Raafat, Cairo (EG); Yasmeen Farouk, Cairo (EG); Mostafa Elkhouly, Cairo (EG); Amira Mohamed, Cairo (EG)

(73) Assignee: SilMinds, LLC, Egypt, Cairo (EG)

( * ) Notice: Subject to any disclaimer, the term of this patent is extended or adjusted under 35 U.S.C. 154(b) by 341 days.

(21) Appl. No.: 13/177,549

(22) Filed: Jul. 6, 2011

(65) Prior Publication Data

US 2012/0011181 A1 Jan. 12, 2012

Related U.S. Application Data

(60) Provisional application No. 61/361,541, filed on Jul. 6, 2010.

(51) Int. Cl.
*G06F 7/38* (2006.01)

(52) U.S. Cl.
USPC ............ 708/501; 708/204; 708/230; 708/497

(58) Field of Classification Search
None
See application file for complete search history.

(56) References Cited

U.S. PATENT DOCUMENTS

| 2006/0047739 A1* | 3/2006 | Schulte et al. | 708/495 |
| 2006/0064454 A1* | 3/2006 | Wang et al. | 708/651 |
| 2010/0235416 A1* | 9/2010 | Oliver | 708/209 |

OTHER PUBLICATIONS

Vazquez, A. et al., "A New Family of High Performance Parallel Decimal Multipliers," in Proceedings of the 18th IEEE Symposium on Computer Arithmetic, Montpellier, France, Jun. 25-27, 2007, 10 pages.

* cited by examiner

*Primary Examiner* — Michael D Yaary
(74) *Attorney, Agent, or Firm* — Osha Liang LLP (57) ABSTRACT

A decimal floating-point Fused-Multiply-Add (FMA) unit that performs the operation of $\pm(A \times B) \pm C$ on decimal floating-point operands. The decimal floating-point FMA unit executes the multiplication and addition operations compliant with the IEEE 754-2008 standard. Specifically, the decimal floating-point FMA includes a parallel multiplier and injects the addend after required alignment as an additional partial product in the reduction tree used in the parallel multiplier. The decimal floating-point FMA unit may be configured to perform addition-subtraction operations or multiplication operations as standalone operations.

20 Claims, 6 Drawing Sheets

DECIMAL FLOATING-POINT FUSED MULTIPLY-ADD UNIT

CROSS-REFERENCE TO RELATED APPLICATIONS

This application is a non-provisional patent application of U.S. Provisional Patent Application Ser. No. 61/361,541, filed on Jul. 6, 2010, and entitled: "A Decimal Fully Parallel Floating-Point Fused-Multiply-Add Unit." Accordingly, this non-provisional patent application claims priority to U.S. Provisional Patent Application Ser. No. 61/361,541 under 35 U.S.C. §119(e). U.S. Provisional Patent Application Ser. No. 61/361,541 is hereby incorporated in its entirety.

BACKGROUND

Many financial and commercial data repositories and applications need to store and compute numerical data in decimal format. However, typical microprocessors do not provide native hardware support for decimal floating-point arithmetic. As a result, decimal numbers are usually converted into binary format for processing by binary floating-point arithmetic units and are converted back into decimal format after the arithmetic computations are completed. Since decimal numbers cannot be represented exactly in binary format, the conversions between the two formats may lead to precision errors. Although an error from a single conversion is generally small, many calculations and systems performing these calculations may require several back-and-forth conversions between the two formats, leading to larger and more significant errors.

In general, especially for commercial and financial applications, errors introduced by converting between decimal and binary numbers, even for a single conversion step, are unacceptable and may violate accuracy standards. Many current solutions use software-based computations that can eliminate precision errors. However, a software-based floating-point unit is several orders of magnitude slower than a hardware-based floating-point unit. This reduced performance is often unacceptable in settings that require high calculation throughput and/or low latency per calculation. In order to achieve accurate and fast decimal floating-point calculations, a hardware-based decimal floating-point unit is needed.

SUMMARY

In general, in one aspect, the invention relates to a circuit for performing decimal floating-point fused-multiply-add (FMA) calculation of $\pm A \times B \pm C$. The circuit includes (i) a formulation unit configured to generate a multiplicand significand, a multiplicand exponent, a multiplier significand, a multiplier exponent, an addend significand, and an addend exponent by decoding a multiplicand, a multiplier, and an addend, respectively, according to a decimal floating-point format comprising a plurality of binary-coded-decimal (BCD) digits, wherein the multiplicand, the multiplier, and the addend are represented by A, B, and C, respectively. (ii) a decimal FMA core coupled to the formulation unit and including (a) a shifter configured to shift the addend significand based on the multiplicand exponent, the multiplier exponent, and the addend exponent to generate an aligned addend significand, (b) a partial product generator configured to generate a plurality of partial products from the multiplicand significand and the multiplier significand concurrently with generating the aligned addend significand, and (c) an adder configured to generate an intermediate result significand by (1) when $\pm A \times B$ and $\pm C$ have a same sign indicating an addition: adding the plurality of partial products and the aligned addend significand and (2) when $\pm A \times B$ and $\pm C$ have opposite signs indicating a subtraction: adding the plurality of partial products and a nine's complement of the aligned addend significand, and (iii) a result generator coupled to the decimal FMA core and configured to (a) selectively increment the intermediate result significand to convert the nine's complement into a ten's complement when $\pm A \times B$ and $\pm C$ have opposite signs and (b) generate a result of the FMA calculation based on the intermediate result significand.

In general, in one aspect, the invention relates to a method for performing floating-point fused-multiply-add (FMA) calculation of $\pm A \times B \pm C$. The method includes (i) generating a multiplicand significand, a multiplicand exponent, a multiplicand sign, a multiplier significand, a multiplier exponent, a multiplier sign, an addend significand, an addend exponent, and an addend sign by decoding a multiplicand, a multiplier, and an addend, respectively, according to a decimal floating-point format comprising a plurality of binary-coded-decimal (BCD) digits, wherein the multiplicand, the multiplier, and the addend are represented by A, B, and C, respectively, (ii) shifting the addend significand based on the multiplicand exponent, the multiplier exponent, and the addend exponent to generate an aligned addend significand, (iii) generating a plurality of partial products from the multiplicand significand and the multiplier significand concurrently with generating the aligned addend significand, (iv) generating an intermediate result significand by (a) when $\pm A \times B$ and $\pm C$ have a same sign indicating an addition: adding the plurality of partial products and the aligned addend significand and (b) when $\pm A \times B$ and $\pm C$ have opposite signs indicating a subtraction: adding the plurality of partial products and a nine's complement of the aligned addend significand, (v) selectively incrementing the intermediate result significand to convert the nine's complement into a ten's complement when $\pm A \times B$ and $\pm C$ have opposite signs, and (vi) generating a result of the FMA calculation based on the intermediate result significand.

In general, in one aspect, the invention relates to a non-transitory computer-readable medium storing a description expressed in a hardware description language which is interpreted by a computer to specify a circuit. The circuit includes (i) a formulation unit configured to generate a multiplicand significand, a multiplicand exponent, a multiplier significand, a multiplier exponent, an addend significand, and an addend exponent by decoding a multiplicand, a multiplier, and an addend, respectively, according to a decimal floating-point format comprising a plurality of binary-coded-decimal (BCD) digits, wherein the multiplicand, the multiplier, and the addend are represented by A, B, and C, respectively. (ii) a decimal FMA core coupled to the formulation unit and including (a) a shifter configured to shift the addend significand based on the multiplicand exponent, the multiplier exponent, and the addend exponent to generate an aligned addend significand, (b) a partial product generator configured to generate a plurality of partial products from the multiplicand significand and the multiplier significand concurrently with generating the aligned addend significand, and (c) an adder configured to generate an intermediate result significand by (1) when $\pm A \times B$ and $\pm C$ have a same sign indicating an addition: adding the plurality of partial products and the aligned addend significand and (2) when $\pm A \times B$ and $\pm C$ have opposite signs indicating a subtraction: adding the plurality of partial products and a nine's complement of the aligned addend significand, and (iii) a result generator coupled to the decimal FMA core and configured to (a) selectively increment the intermediate result significand to convert the nine's complement into a ten's complement when ±A×B and ±C have opposite signs and (b) generate a result of the FMA calculation based on the intermediate result significand.

Other aspects of the invention will be apparent from the following detailed description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provide a decimal floating-point Fused-Multiply-Add (FMA) unit that performs the operation (i.e., calculation) of ±(A×B)±C on decimal floating-point operands (i.e., multiplicand, multiplier, and addend). In one or more embodiments, the decimal floating-point FMA unit executes the multiplication and addition operations compliant with the IEEE 754-2008 standard. Specifically, the decimal floating-point FMA includes a parallel multiplier and injects the addend after required alignment as an additional partial product in the reduction tree (e.g., a carry save adder) used in the parallel multiplier. The decimal floating-point FMA unit may be configured to perform addition-subtraction operations or multiplication operations as standalone operations. In one or more embodiments, the decimal floating-point FMA includes a fully parallel Kogge-Stone based decimal adder as the final carry propagation adder with the result rounded once to produce a final decimal floating-point output fully compliant to IEEE 754-2008 standard. Using a single final rounding operation leads to a more accurate result instead of executing the FMA operation in a serial configuration (i.e., a multiplication followed by an addition). Further, the exceptional cases handling in the decimal floating-point FMA mandates that no underflow exception arise due to the addition, but only due to the multiplication, which is opposite to a multiplication operation followed by an addition operation where no underflow, overflow, or inexact exception can arise due to the multiplication, but only due to the addition; and so fused-multiply-add differs from a multiplication operation followed by an addition operation.

In one or more embodiments, the decimal floating-point FMA unit may be pipelined to generate a complete decimal floating-point result in each clock cycle.

Figure 1A:
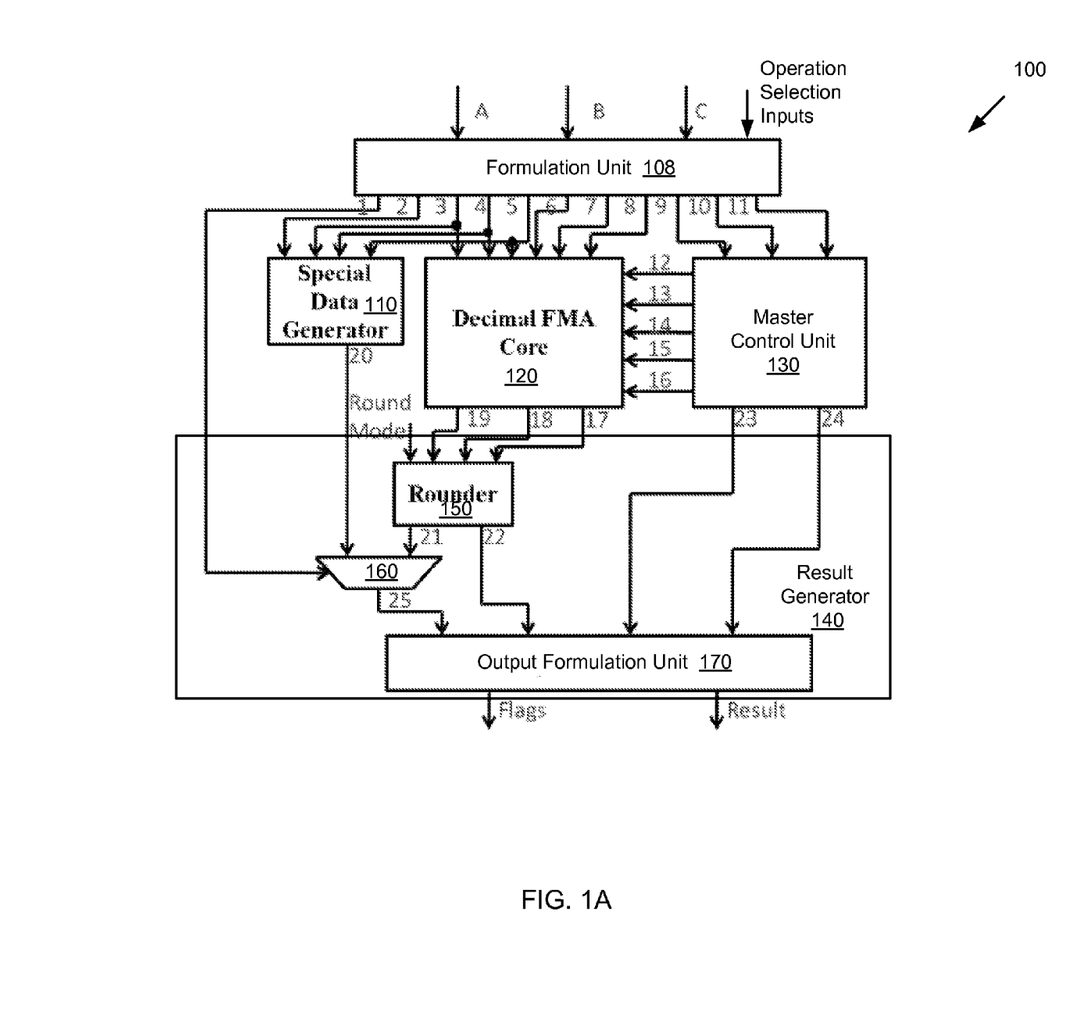
FIGS. 1A-1C shows a schematic diagram of a decimal floating-point fused multiply-add (FMA) unit in accordance with one or more embodiments of the invention.

FIG. 1A depicts a schematic block diagram of a circuit (100) in accordance with one or more embodiments of the invention. In one or more embodiments of the invention, one or more of the modules and elements shown in FIG. 1A may be omitted, repeated, and/or substituted. Accordingly, embodiments of the invention should not be considered limited to the specific arrangements of modules shown in FIG. 1A. The circuit (100) of FIG. 1A depicts the components of a decimal floating-point FMA in accordance with embodiments disclosed herein.

As shown in FIG. 1A, the circuit (100) is configured to perform a decimal floating-point fused-multiply-add (FMA) calculation of ±A×B±C, where A, B, and C represent decimal floating-point input multiplicand, multiplier, and addend, respectively. The input multiplicand, multiplier, and addend are collectively referred to as the input operands. The circuit (100) includes formulation unit (108), special data generator (110), decimal FMA core (120), master control unit (130), and result generator (140) having rounder (150), multiplexor (160), and output formulation unit (170).

In one or more embodiments, the circuit (100) includes the formulation unit (108) configured to generate a multiplicand sign (6), a multiplicand significand (3), a multiplicand exponent (9), a multiplier sign (7), a multiplier significand (4), a multiplier exponent (10), an addend sign (8), an addend significand (5), and an addend exponent (11) by decoding a multiplicand (A), a multiplier (B), and an addend (C), respectively, according to a decimal floating-point format based on binary-coded-decimal (BCD) digits. For example, the decimal floating-point format may be the IEEE Standard 754-2008 where the exponent of each input operand is the biased exponent and the significand of each input operand is converted to the BCD format. In one or more embodiments, the formulation unit (108) is further configured to detect if the input operands are special values (e.g., Not-a-Number (NaN) or Infinity) and generate the corresponding flags (1) and (2) used to select a proper special result to replace a calculated result from the decimal FMA core (120). The decoded multiplicand, multiplier, and addend significands (3), (4), and (5) are then introduced as inputs to the special data generator (110) that generates the corresponding special result controlled by the output flags (20) from the formulation unit (108). In one or more embodiments, the formulation unit (108) receives the operation selection inputs to specify the first ± operation, the second ± operation, and one of fused-multiply-add, multiply-only, and add-only operations for the FMA calculation ±(A×B) ±C.

In one or more embodiments, the circuit (100) includes the special data generator (110) that is configured to prepare the special value result in parallel to the normal data path to replace the intermediate value in case of special result. For example, if some input operands are Not-a-Number (NaN), special data generator (110) outputs the smallest significand to replace the output from the decimal FMA core (120). Other special conditions include Infinity in the FMA calculation, such as Infinity−Infinity.

Figure 1B:
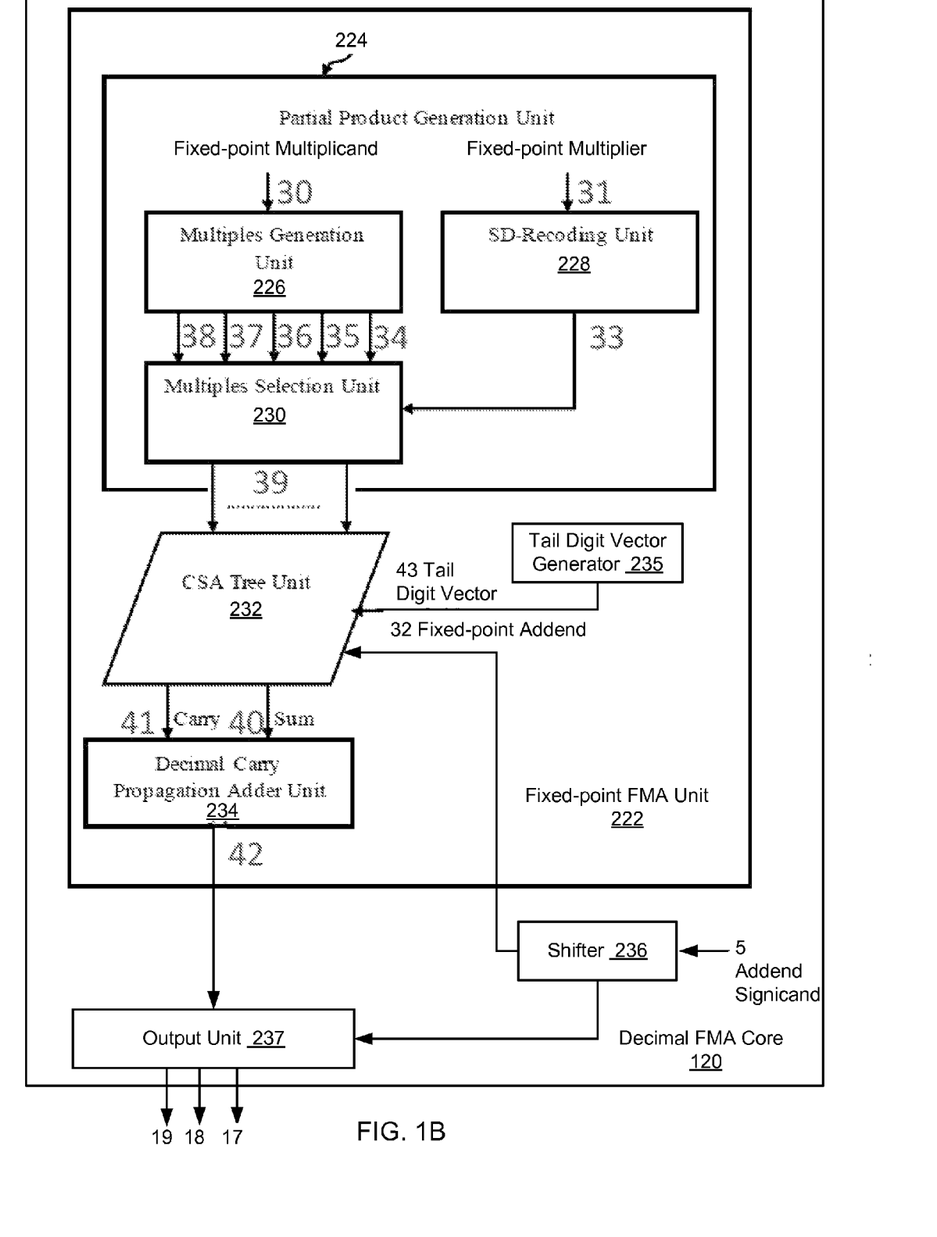

In parallel to the processing performed by the special data generator (110), the decimal FMA core (120) receives the decoded operand significands (3), (4), (5) and decoded operand signs (6), (7), and (8) to perform the required operation controlled by input signals (12)-(16) from the master control unit (130). FIG. 1B shows additional details of the decimal FMA core (120) having fixed-point FMA unit (222), shifter (236), and output unit (237). In one or more embodiments of the invention, one or more of the modules and elements shown in FIG. 1B may be omitted, repeated, and/or substituted. Accordingly, embodiments of the invention should not be considered limited to the specific arrangements of modules shown in FIG. 1B.

The addend (C) needs to be aligned properly for adding to the expected resultant product of A×B. The required alignment value is based on the difference between the resultant exponent of A×B and the addend exponent (11). The decimal FMA core (120) receives a left/right shift amount input (13) from the master control unit (130) to be used for properly aligning the addend (C). In one or more embodiments, each of the input operand significands (3), (4), and (5) has p precision digits (i.e., the IEEE 754-2008 standard precision) represented in an expanded precision (e.g., 4p+1) digit window, which is described in reference to the example depicted in FIG. 3 below. The addend (C) is aligned within the expanded precision digit window. In one or more embodiments, the shifter (236) is configured to shift the addend significand (5) based on the multiplicand exponent (9), the multiplier exponent (10), and the addend exponent (11) to generate an aligned addend significand, which is provided to the fixed-point FMA unit (222) as the fixed-point addend (32). Any digits dropped by such shift beyond the expanded precision digit window are collected by the output unit (237) into a "sticky bit" (17) by logically ORing the dropped digits. In one or more embodiments, the dropped digits are identified based on the sticky counter digits (14) and sticky counter result digits (16).

In one or more embodiments, the fixed point FMA unit (222) includes the partial product generation unit (224) that is configured to generate partial products (39) from the fixed-point multiplicand (30) and the fixed-point multiplier (31) concurrently with the aforementioned shifter (236) generating the aligned addend significand as the fixed-point addend (32). In particular, the fixed-point multiplicand (30) and the fixed-point multiplier (31) may be the same as the multiplicand significand (3) and the multiplier significand (4), respectively, depicted in FIG. 1A above.

In one or more embodiments, the partial product generation unit (224) includes multiples generation unit (226), signed-digits (SD)-recoding unit (228), and multiples selection unit (230). In one or more embodiments, the multiples generation unit (226) is configured to generate integer multiples (34)-(38) of the fixed-point multiplicand (30), such as one time (1×), two times (2×), three times (3×), four times (4×), and five times (5×) multiples of the fixed-point multiplicand (30). More details of generating the multiples are described in reference to FIG. 2 below.

In one or more embodiments, the SD-recoding unit (228) is configured to convert the fixed-point multiplier (31) into signed digits sets (33). In one or more embodiments, each of the signed digits sets (33) is represented by a number of one-hot control signals used to select one of the multiples (34)-(38) using the multiples selection unit (230) to generate the partial products (39). In one or more embodiments, the SD-recoding unit (228) encodes the p digits in the fixed-point multiplier (31) into p SD radix-10 digits. Based on the current multiplier digit and the next least significant digit, the output is recoded in signed-digit format. Let B=($B_n$ $B_{n-1}$ $B_{n-2}$ ... $B_0$) denote the multiplier and Bi denotes the ith digit of the multiplier B. Then, to check the next least significant digit $B_{i-1}$, a signal in the signed digit sets (33) is raised when digit $B_{i-1}$ is greater than or equal to 5. Accordingly, the number of the generated partial products is equal to the number of multiplier digits. In response to generating the multiples and the selection control signals based on the current multiplier digit, the multiples selection process is performed using the multiples_selection unit (230), which uses the five generated multiples and the selection control signals as inputs and results in the generated ith partial product. Tail digit is generated by the tail digit generator (235) and may be 0 or 1 based on the sign of the previous partial product. If the previous partial product is negative then the tail digit will be 1. This is because the negative partial product is represented in its 1's complement format requiring additional 1 to be added in order to get its 2's complement format.

For example, each of the signed digits sets (33) is represented by six selection lines for each of the p individual SD sets. Five selection lines are used to select between the five generated multiples {1×, 2×, 3×, 4×, 5×} of the fixed-point multiplicand (30). The sixth selection line controls the sign of the multiple selected by the signed digits sets (33). For example, if the six selection lines representing an individual SD set are 100010, −2× is selected from the multiple set {1×, 2×, 3×, 4×, 5×} and if the six selection lines representing an individual SD set are 010000, 5× is selected from the multiple set {1×, 2×, 3×, 4×, 5×}.

Each of the partial products (39) is shifted from the previous one by one digit to the left before being added. The partial products (39) are generated further according to the sign of A×B where the negative partial products are inverted. Based on the signs of ±A×B and ±C, the effective FMA operation (EOP) (12) may be addition or subtraction. For example, the EOP may be set to zero if ±A×B and ±C have the same sign while EOP may be set to one if ±A×B and ±C have the opposite signs. In one or more embodiments, if the EOP (12) indicates a subtraction, the fixed-point addend (32) is inverted.

In one or more embodiments, the fixed point FMA unit (222) includes the carry save adder (CSA) tree unit (232) configured to generate an intermediate result (40) and (41) by adding the partial products (39) and the fixed-point addend significand (32). In one or more embodiments, the partial products (39) and the fixed-point addend significand (32) are in a BCD-4221 format to reduce the circuit delay time of the multiples generation unit (226). More details of reducing the circuit delay time based on the BCD-4221 format are described in reference to FIG. 2 below.

In one or more embodiments, the fixed point FMA unit (222) includes carry propagation adder (CPA) unit (234) that is configured to generate a non-redundant output (42) by adding the sum vector (40) and the carry vector (41) of the intermediate result. In one or more embodiments, the (CSA) tree unit (232) and the CPA unit (234) are configured with (2p+1)-digit precision.

In one or more embodiments, the decimal FMA core (120) includes the output unit (237) that is configured to select a least significant bit of a most significant digit of the non-redundant output (42) as an output carry bit. In one or more embodiments, if the EOP (12) indicates a subtraction, the unrounded result (19) of the decimal FMA core (120) is selected by the output unit (237) from the non-redundant output (42) and its ten's compliment value (i.e., incremented from the previously generated nine's complemented value) based on the EOP (12) and the output carry bit.

In conventional decimal floating-point multipliers, the carry out signal from the final CPA is typically not used since the result from the multiplication is always the summation of the partial product vectors. In one or more embodiments, the carry out signal from the CPA unit (234) is used to determine (i) if there is a need to complement the result from the CPA unit (234) (i.e., in case of subtraction); (ii) if there is an overflow that will effect the selection of the most p digits handled outside the CSA tree unit (232) in case of addition; and (iii) the sign of the result (+ve or −ve). As is described in the example depicted in FIG. 3 below, the middle 2p digits from the 4p+1 aligned addend digits are processed within the CSA unit (232) while the least significant p+1 digits and most significant p digits are processed separately. In case of addition as indicated by the EOP (12), the carry out signal from the CPA unit (234) equals one, which is used to select the incremented (i.e., plus one) value of the most p digits from the 4p+1 aligned addend digits. Simple example scenarios of complementing the result from the CPA unit (234) and determining the sign of the result as +ve or −ve are described below.

(1) For −3+5 (consider −3 as the A×B value), the value of the addend C is complemented so 3 is added to the ten's complement of the addend (ten's complement of 5 equals 5) where 3+5 summed to 8 with carry output equals 0. This means that the result value 8 needs to be complemented and so its ten's complement value is the correct result 2. The sign of the result is computed in parallel to be +ve sign resulting in +2.

(2) For −4+2 (consider −4 as the A×B value), the value of the addend C is complemented so 4 is added to the ten's complement of the addend (ten's complement of 2 equals 8) where 4+8 summed to 2 with carry output equals 1. This means that the result value 2 is correct and no complement is needed. The sign of the result is computed to in parallel be −ve sign resulting in −2.

(3) For 4−9 (consider 4 is the A×B value), the value of the addend C is complemented so 4 is added to the ten's complement of the addend (ten's complement of 9 equals 1) where 4+1 summed to 5 with carry output equals 0. This means that the result value 5 needs to be complemented and so its ten's complement value is the correct result 5. The sign of the result in parallel is computed to be −ve sign resulting in −5.

(4) For 7−4 (consider 7 is the A×B value), the value of the addend C is complemented so 4 is added to the ten's complement of the addend (ten's complement of 4 equals 6) where 7+6 summed to 3 with carry output equals 1. This means that the result value 3 is correct and no complement is needed. The sign of the result in parallel is computed to be +ve sign resulting in +3.

Using BCD-4221 with sign-extension may cause incorrect carry out from the CPA in conventional decimal floating-point multipliers. To overcome this issue and thus have correct carry out, CSA tree unit (232) and the CPA unit (234) are configured with width 2p+1 digits and use the last p digit to represent the carry out signal. In particular, the least bit of that digit is always 1 or 0 because the value of that digit is always 0 or 1 in BCD-8421 format "0000" or "0001".

Figure 1C:
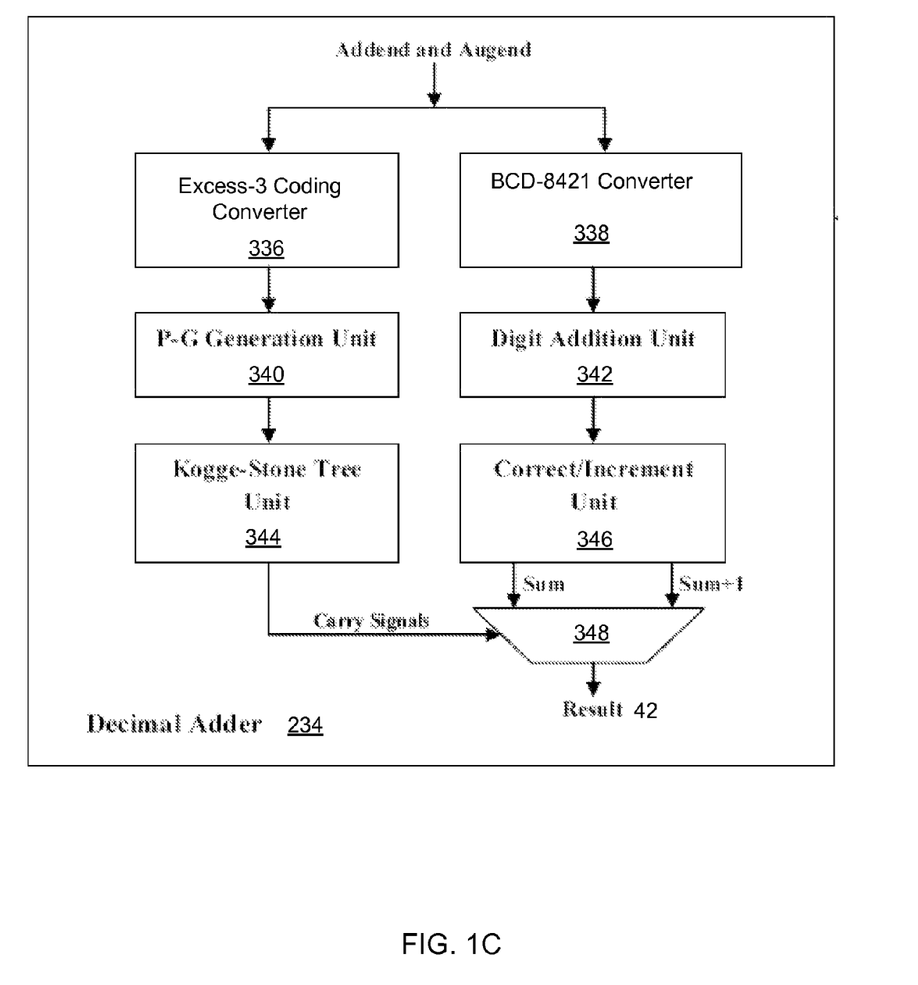

FIG. 1C shows details of the CPA unit (234) consisting of two main paths: one for digits summation and the other for carry signals generation. Digits summation path receives the sum vector (40) and the carry vector (41) as the addend and augend that are converted into to BCD-8421 coding type using BCD-8421 converter (338) and added in digit-by-digit fashion without carry propagation using the digit addition unit (342). The correct/increment unit (346) maps the resultant digits sum to be in the decimal numbers range (0 . . . 9) and generate digits sum "Sum" and its incremented version "Sum+1". In parallel to the digits summation path, the carry vector generation path converts the addend and augend into Excess-3 coding type using Excess-3 coding converter (336). The P-G generation unit (340) uses the characteristic of the Excess-3 coding type to generate the P-G signals without adding the Addend and Augend. The Kogge-Stone tree unit (344) receives the generated P-G signals and outputs a carry vector to select between "Sum" and its incremented version "Sum+1". The last bit in the generated carry vector represents the output carry used by the output unit (237) of the decimal FMA core (120).

Returning to the discussion of FIG. 1A, the circuit (100) includes a master control unit (130) coupled to the decimal FMA core (120) and configured to determine (i) a right/left shift amount (13) based on the multiplier exponent (10), the multiplicand exponent (9), and the addend exponent (11), where the right/left shift amount is provided to the decimal FMA core (120) for shifting the addend significand (6) to align with the partial products (39); (ii) a left shift amount (15) based on a decimal point position and leading zero digits of the intermediate result significand (42), where the left shift amount (15) is provided to the decimal FMA core (120) for shifting the intermediate result significand (42) by the output unit (237); (iii) a number of digits for generating the sticky bit (17) that accounts for lost of precision as a result of an operand shifting operation in (i) and/or (ii); (iv) EOP of the FMA calculation indicating one of addition or subtraction; and (v) an result exponent (23) of the FMA calculation based on the multiplier exponent (10), the multiplicand exponent (9), and the addend exponent (11).

In one or more embodiments, the master control unit (130) receives the input operands exponents as biased exponents (represented as Ea, Eb, and Ec) and computes the shift amount needed for addend alignment. The shift amount can be computed using the equation: Alignment Difference=(Ea+Eb−Bias)−Ec, where Bias is the IEEE 754-2008 standard Bias. Based on the Alignment Difference, the addend significand (5) may be shifted to the right or to the left.

In one or more embodiments, the circuit (100) includes the result generator (140) that is configured to generate a result of the FMA calculation based on the intermediate result significand (19) and result exponent (24), which are encoded by the output formulation unit (170) into the floating-point format, such as the IEEE 754-2008 format. The output formulation unit (170) also generates the appropriate standard exception flags (e.g., underflow, overflow, invalid and inexact) conforming to IEEE Standard 754-2008. As noted above, the circuit (100) includes the special data generator (110) that is configured to replace, in response to the formulation unit (108) identifying a special input combination (e.g., including one or more of Not-a-Number or Infinity) from the input operands, the intermediate results (17)-(19) and (21) by the Not-a-Number in the operands.

In one or more embodiments, the result generator (140) includes the rounder unit (150) that is configured to round the unrounded result (19), which may be left shifted to remove the leading zeros for generating more accurate result with more non-zero precision digits. The least significant digits next to the guard digit of the unrounded result (19) are used to generate a sticky bit (17) to be used for properly rounding the unrounded result (19).

The rounder unit (150) receives the most significant (p+1) digits of the unrounded result (19), the input rounding direction (i.e., round mode), the resultant sign (18), guard digit and the sticky bit (17). In one or more embodiments, the rounder unit (150) supports seven rounding directions including Round to Nearest ties to Even (RNE), Round to Nearest ties Away from zero (RNA), Round to Nearest ties Toward zero (RNT), Round Away from Zero (RAZ), Round Toward Zero (RTZ), Round toward Positive Infinity (RPI) and Round toward Minus Infinity (RMI). The rounder unit (150) is configured to execute the rounding operation based on conditions shown in Table 1. The rounded FMA result (21) is selected to be: (i) the p most significant digits of the input unrounded result (19), referred to as the preliminary FMA Result (PFR); or (ii) its incremented by one value (PFR+). The rounder unit (150) may generate an exponent increment flag (22), if the most significant (p) digits of the preliminary FMA result are all nines and the rounder takes the decision of rounding up the preliminary FMA result, then a one digit right shift is needed and this shift corresponds to incrementing the exponent by one.

TABLE 1

| LSB | GD | sticky Bit | RNE (+/−) | RNT (+/−) | RNA (+/−) | RPI (+/−) | RMI (+/−) | RTZ (+/−) | RAZ (+/−) |
|---|---|---|---|---|---|---|---|---|---|
| X | 0 | 0 |  | PFR |  | PFR | PFR | PFR | PFR |
| X | 0 | 1 |  | PFR |  | PFR+/PFR | PFR/PFR+ | PFR | PFR+ |
| X | <5 | X |  |  |  |  |  |  |  |
| 0 | 5 | 0 | PFR | PFR | PFR+ |  |  |  |  |
| 1 | 5 | 0 | PFR+ | PFR | PFR+ |  |  |  |  |
| 0 | 5 | 1 |  | PFR+ |  |  |  |  |  |
| 1 | 5 | 1 |  |  |  |  |  |  |  |
| X | >5 | X |  |  |  |  |  |  |  |

Figure 2:
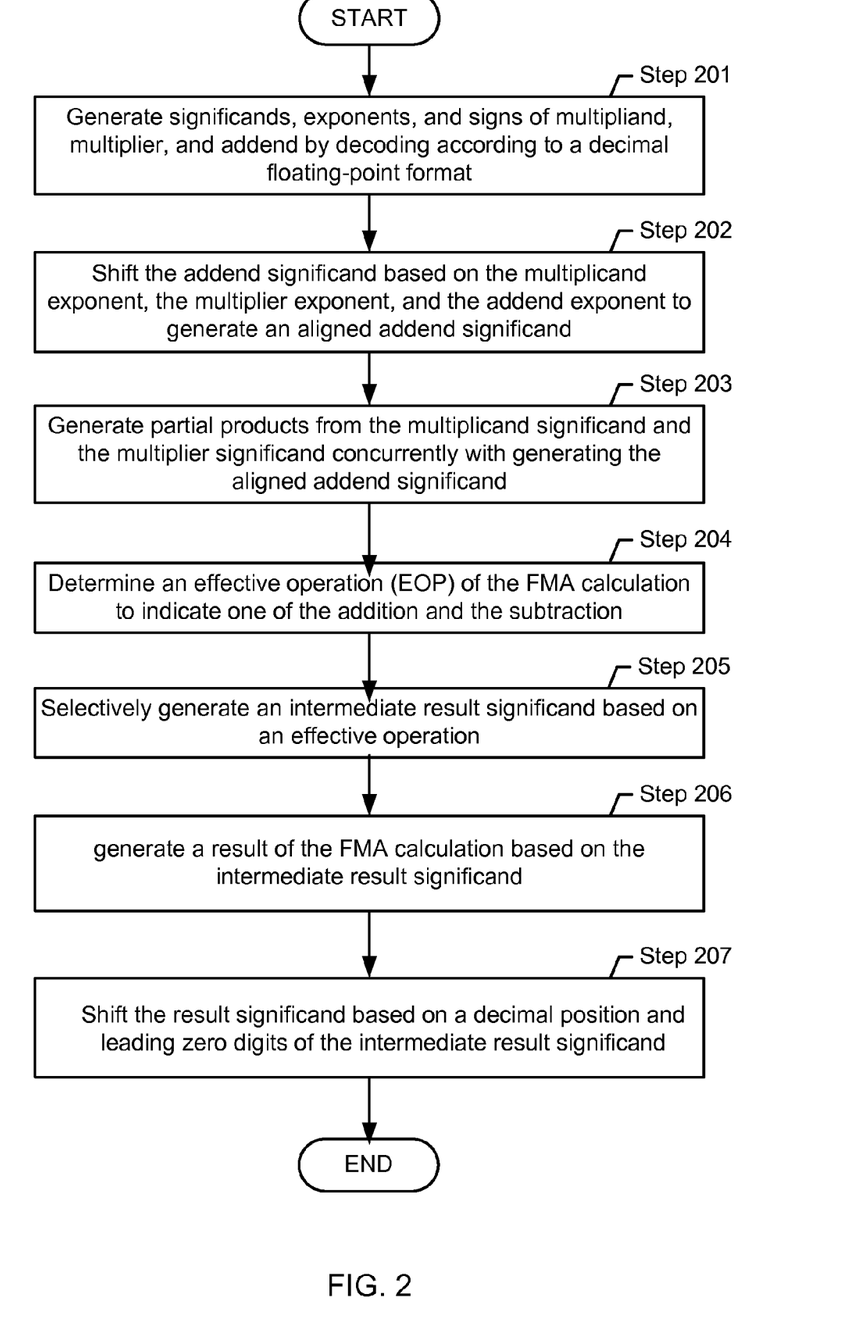
FIG. 2 shows a flow chart of a method in accordance with one or more embodiments of the invention.

Legends: GD = Guard digit. LSB = Least Significant Bit of the preliminary FMA result FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1A above.

The method shown in FIG. 2 is for performing the FMA calculation of ±A×B±C, wherein A, B, and C represent the multiplicand, the multiplier, and the addend, respectively, in a decimal floating-point format. For example, the decimal floating-point format may be compliant with the IEEE Standard 754-2008.

Initially, in Step 201, a multiplicand significand, a multiplicand exponent, a multiplier significand, a multiplier exponent, an addend significand, and an addend exponent are generated by decoding the multiplicand A, the multiplier B, and the addend C, respectively, according to the decimal floating-point format. If one or more of the inputs are special value (NaN or Infinity), some flags are generated.

In Step 202, the addend significand is shifted based on the multiplicand exponent, the multiplier exponent, and the addend exponent to generate an aligned addend significand that is aligned to partial products of the multiplication. In one or more embodiments, the right/left shift amount for aligning the addend significand is determined based on the multiplier exponent, the multiplicand exponent, and the addend exponent.

In Step 203, partial products are generated from the multiplicand significand and the multiplier significand concurrently with generating the aligned addend significand. For example, the partial products may be generated using the partial product generation unit (224) described in reference to FIG. 1B above.

In Step 204, an effective operation (EOP) of the FMA calculation is determined to indicate addition or subtraction. In one or more embodiments, the EOP may be set to zero if ±A×B and ±C have the same sign and if A, B and C are positive operands while EOP may be set to one if ±A×B and ±C have the opposite signs. For example, the EOP may be computed by an XOR operation of the two ± signs and the signs of the operands A, B, and C. In one or more embodiments, Step 202 and Step 204 may be performed in parallel.

In Step 205, an intermediate result significand is generated using a carry save adder (CSA) based on the EOP. In one or more embodiments, the partial products and the aligned addend significand are in a BCD-4221 format to speed up the circuit delay in generating the multiples of the multiplicand and handling inversion when ±A×B and ±C have the opposite signs. Specifically, when EOP indicates an addition, the intermediate result significand is generated by adding the partial products and the aligned addend significand using the carry save adder (CSA). When EOP indicates a subtraction, the intermediate result significand is generated by adding the partial products and a nine's complement of the aligned addend significand. In one or more embodiments, the nine's complement is converted into a ten's complement for proper inversion required by the subtraction in a later step when the result of the FMA calculation is generated. The two step inversion is to take advantage of the fast generation of the nine's complement of the aligned addend significand, which is generated by an XOR operation between the aligned addend significand and the EOP. Specifically, each BCD-4221 digit of the aligned addend significand is XORed with the EOP to generate the nine's complement based on the characteristic of the BCD-4221 coding type.

In one or more embodiments, the intermediate result significand is in a redundant format having a sum vector and a carry vector that are added together to generate a non-redundant output using a carry propagation adder (CPA). Generally, the decimal floating-point format is based on p-digit precision, for example specified in the IEEE Standard 754-2008. In one or more embodiments, the CSA and the CPA are configured with (2p+1)-digit precision.

In Step 206, a result significand of the FMA calculation is generated based on the non-redundant output from the intermediate result significand. In one or more embodiments, the aforementioned CPA is configured to generate a carry output based on a least significant bit of a most significant digit of the non-redundant output of the CPA. In one or more embodiments, if the EOP indicates a subtraction, the result of the FMA calculation is selected from the non-redundant output or its incremented value based on the EOP and the output carry bit. Accordingly, the incremented value converts the aforementioned nine's complement to ten's complement for proper inversion required by the subtraction.

In Step 207, the result significand is shifted based on a decimal position and leading zero digits of the intermediate result significand.

In one or more embodiments, an exponent of the result of the FMA calculation is determined based on the multiplier exponent, the multiplicand exponent, and the addend exponent. Accordingly, the result significand and the result exponent are encoded into the floating-point format.

Figure 3:
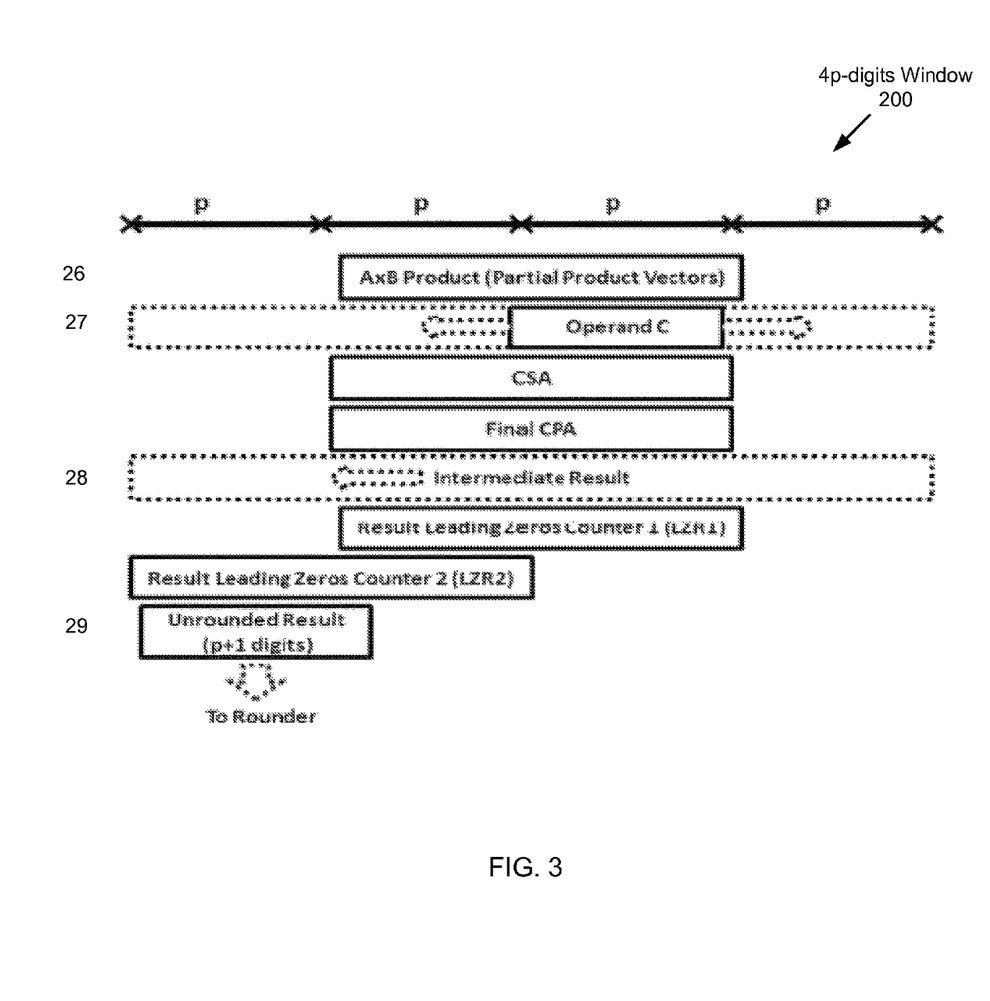
FIG. 3 shows an example for the decimal floating-point FMA unit in accordance with one or more embodiments of the invention.

FIG. 3 shows an example for the decimal floating-point FMA unit. This example application may be practiced using the system (100) of FIG. 1A and based on the method described with respect to FIG. 2 above. Specifically, FIG. 3 shows an example of the expanded precision (e.g., 4p+1) digit window described in reference to FIG. 1 above. An example FMA calculation is described below based on FIGS. 1A, 1B, and 3. In this example, the decimal floating-point FMA circuit is configured with Mode=Decimal64 or Decimal128 with half-precision, Operation Selector=FMA Operation, Rounding Mode=Truncate or Round Down, and the FMA operation is −(A×B)+C. Each input and output signal is described below based on the reference numerals included in FIGS. 1A, 1B, and 3.

A: +9968068980079252E297 or F6DFAE 1A08E1E552 in IEEE std 754-2008 DPD format.

B: −8604315E-317 or 81440000008C1195 in IEEE std 754-2008 DPD format.

C: −8390606101329647E-13 or EA059AC18816A747 in IEEE std 754-2008 DPD format.

Operands A, B and C are written in hexadecimal format in this disclosure to represent actual DPD values decoded in formulation unit (108).

1: 0 (Normal or Special flag). It is raised when special value (Infinity or NaN) is detected in one of the inputs A, B, and C. Here, the case is normal because all the inputs have normal values.

2: 00 (Special Data Selection Vector). If one input is qNaN or sNaN, its significand value is bypassed to the output of the special data generator (110). If two or three operands of the inputs are either qNaN or sNaN, the smallest of the significand values is chosen. In normal cases, it always outs the significand of operand A and has the value 00.

| Normal or Special flag | Special Data Selection Vector | Output |
|---|---|---|
| 0 | Don't care | Don't care |
| 1 | 00 | A |
| 1 | 01 | B |
| 1 | else | C |

3: 9968068980079252 (Decoded Significand A)

4: 0000000008604315 (Decoded Significand B)

5: 8390606101329647 (Decoded Significand C)

Significands A, B and C are written in hexadecimal format in this disclosure to represent actual BCD-8421 values after decoding in formulation unit (108).

6: 0 (Decoded Sign A)

7: 1 (Decoded Sign B)

8: 1 (Decoded Sign C)

9: 1010110111 (Decoded Exponent A); the binary representation for the value 695

10: 0001010001 (Decoded Exponent B); the binary representation for the value 81

11: 0110000001 (Decoded Exponent C); the binary representation for the value 385

As explained in the IEEE 754-2008, the bias (398 for Decimal64) is added during the decoding to the exponents of the input operands (i.e. exponent A=297+398=695)

12: 1 (The effective Operation EOP); 1 for subtraction and 0 for addition

EOP=Sign(±A×B) XOR Sign(A) XOR Sign(B) XOR Sign (±C)

13: 111 (Shift Amount Operand C)

The expected exponent for the product A×B=695+81−398=378 (as the standard recommends because there is two biases added for the two operands and one of them is removed). For adding C correctly to the expected product result, it should be shifted so that the exponents are equal for proper addition. Since C has higher exponent (385), it should be left shifted by 7 digits (385-378) for proper alignment.

14: 0 (Sticky Counter C digits); it counts the number of digits that should be collected in the sticky bit in case of right shifting of the operand C (the addend). In this case, it is left shifting and has zero value 15: 011010 (Shift Amount Result); this binary value represent the number of digits by which the result should be left shifted (26 digit).

16: 010101 (Sticky Counter Result digits); this binary value represent the number of digits that will be lost due to fitting the result in p+1 digits (21 digit).

17: 1 (Sticky Bit value); the result from ORing the digits which is lost due to fitting the result in p+1 digits.

18: 0 (The Sign of the Result)

19: 18623444330341391; the unrounded Result (p+1 digits)) written in hexadecimal format representing BCD-8421.

20: 9968068980079252; the value of decoded significand A since this case does not have special value in any of the operands.

21: 1862344433034139; the rounded Result (p digits)) written in hexadecimal format representing BCD-8421.

22: 1 (The Inexact flag); raised when: (1) any digits may be lost due to shifting or rounding operation, (2) underflow flag is raised, or (3) overflow flag is raised. For example, addend alignment may cause a right shift while resultant shifting may cause a left shift.

23: 0110000000 (The Resultant exponent); binary value representing 384, which will be decremented by the bias 398 during the encoding in the output formulation unit (170) resulting in 384−398=−14.

24: 000 (The Flags: Overflow, Underflow and Invalid)

Overflow is raised when: (1) the resultant exponent is greater than a pre-determined threshold emax or (2) the resultant exponent equals emax and the −resultant after rounding indicates a carry out signal (i.e., incrementing the un-round result by one is needed) and the exponent increment flag (i.e., an input to the master control unit (130) from the rounder (150)) is raised.

Underflow is raised when the resultant exponent is less than a pre-determined threshold emin.

Invalid is raised when: (1) one of the operands is sNaN, (2) ±AB ±C is a magnitude subtraction of Infinities (Infinity−Infinity), or (3) (A=Infinity, B=0, C=c) OR (A=0, B=Infinity, C=c)

25: 1862344433034139; written in hexadecimal format in this disclosure to represent actual BCD-8421.

Flag: 10000 (Inexact, Overflow, Underflow, Invalid and Divide by zero)

The divide by zero flag is important for division operation only) and is generated to be compliant with IEEE 754-2008 standard.

Result: 26016C712330D0B9; written in hexadecimal format in this disclosure to represent actual DPD values after encoding in the output formulation unit (170). Or +1862344433034139E-14 in human readable format.

Flags: Inexact Flag

26: 0000000000000000 0000000000000000 8390606101329647 0000000000000000.

The value is in hexadecimal format representing BCD-8421. The expected product result is 2p length. So that, the allowable right shift for the addend is p+1+trailing Zero-digits to the right or 2p+leading Zero-digits to the left.

27: 0000000000000000 0000000008390606 1013296470000000 0000000000000000

The value is written in hexadecimal format in this disclosure to represent actual BCD-8421. After aligning (left shifting)

the addend (Operand C), the middle 2p digits will be recoded to BCD-4221 then XORed with the effective operation (EOP) to be complemented because this case is subtraction operation. Then, it will be injected to the CSA tree unit (232) as the fixed-point addend (32).

The least p digits of the addend are handled in parallel in case of right shifting for addend significand.

The most p digits of the addend are handled in parallel in case of left shifting for addend significand by an amount greater than p.

The expected product will be added to the addend is
0000000008576840 5446330609172380
0000000008390606 1013296470000000
This case is subtraction operation, so the intermediate result (non-redundant) A×B−C is given at 28 below.

28: 0000000000000000 0000000000186234 4433034139172380 0000000000000000
The value is written in hexadecimal format in this disclosure to represent actual BCD-8421

The result from the CPA (234) after merging with the most and least p digits is given at 29 below.

29: 18623444330341391
The value is written in hexadecimal format in this disclosure to represent actual BCD-8421 after fitting the 4p digits to p+1 digits by shifting to the preferred exponent and ORing the digits that will be lost (i.e., calculating the sticky bit).

30: 9968068980079252 (Decoded Significand A); written in hexadecimal format in this disclosure to represent actual BCD-8421.

31: 0000000008604315 (Decoded Significand B); written in hexadecimal format in this disclosure to represent actual BCD-8421.

32: 0FFFFFFFFF1C0F5F5 EFECD0574FFFFFFF; written in hexadecimal format in this disclosure to represent actual BCD-4221 after XORing with the EOP to generate the nine's complement.

The BCD-4221 format is used to decrease the delay of the fixed-point-multiplier in both multiples generating unit (226) and the CSA tree unit (232) for the addend injection in case of subtraction. A digit in BCD-4221 is nine complemented by XORing with the sign. For example, 0 in BCD-4221 is a 4-bit digit 0000. If all the bits are XORed with the sign (1 for negative), it gives 1111 (F) which is the BCD-4221 representation of 9 (nine's complement of 0).

33: 17 (p+1) SD sets represented in 6-bit one-hot codes below.
110000
000010
000100
001000
000000
101000
100001
000001
000000
000000
000000
000000
000000
000000
000000
000000
000000

These one-hot outputs are used in performing multiples selection (1×, 2×, 3×, 4×, 5×) of the fixed point multiplicand (30) and assigning selected multiple as negative or positive according to the following table:

| Current Multiplier Digit | Next least Significant Digit | Signed-magnitude Output Digit | Selector | | | | | |
|---|---|---|---|---|---|---|---|---|
| | | | ys | y5 | y4 | y3 | y2 | y1 |
| 0 | <5 | 0 | 0 | 0 | 0 | 0 | 0 | 0 |
| 0 | ≥5 | +1 | 0 | 0 | 0 | 0 | 0 | 1 |
| 1 | <5 | +1 | 0 | 0 | 0 | 0 | 0 | 1 |
| 1 | ≥5 | +2 | 0 | 0 | 0 | 0 | 1 | 0 |
| 2 | <5 | +2 | 0 | 0 | 0 | 0 | 1 | 0 |
| 2 | ≥5 | +3 | 0 | 0 | 0 | 1 | 0 | 0 |
| 3 | <5 | +3 | 0 | 0 | 0 | 1 | 0 | 0 |
| 3 | ≥5 | +4 | 0 | 0 | 1 | 0 | 0 | 0 |
| 4 | <5 | +4 | 0 | 0 | 1 | 0 | 0 | 0 |
| 4 | ≥5 | +5 | 0 | 1 | 0 | 0 | 0 | 0 |
| 5 | <5 | −5 | 1 | 1 | 0 | 0 | 0 | 0 |
| 5 | ≥5 | −4 | 1 | 0 | 1 | 0 | 0 | 0 |
| 6 | <5 | −4 | 1 | 0 | 1 | 0 | 0 | 0 |
| 6 | ≥5 | −3 | 1 | 0 | 0 | 1 | 0 | 0 |
| 7 | <5 | −3 | 1 | 0 | 0 | 1 | 0 | 0 |
| 7 | ≥5 | −2 | 1 | 0 | 0 | 0 | 1 | 0 |
| 8 | <5 | −2 | 1 | 0 | 0 | 0 | 1 | 0 |
| 8 | ≥5 | −1 | 1 | 0 | 0 | 0 | 0 | 1 |
| 9 | <5 | −1 | 1 | 0 | 0 | 0 | 0 | 1 |
| 9 | ≥5 | 0 | 1 | 0 | 0 | 0 | 0 | 0 |

34: 0FFAE0AEFE00BF292; 1× multiple written in hexadecimal format in this disclosure to represent actual BCD-4221.

35: 1FF3A13BFA019E908; 2× multiple written in hexadecimal format in this disclosure to represent actual BCD-4221.

36: 2FF0620CF6023DD9A; 3× multiple written in hexadecimal format in this disclosure to represent actual BCD-4221.

37: 3FEB22B9F2031D00E; 4× multiple written in hexadecimal format in this disclosure to represent actual BCD-4221.

38: 8FE80388F003FA2A0; 5× multiple in hexadecimal format in this disclosure to represent actual BCD-4221.

39: 18 (p+2) partial product vectors each one is 2p+1 length in BCD-4221 format (i.e., p partial product vectors, the tail digit, and the addend).

Due to using BCD-4221 format to speed up the multiples generation process and using the sign-extension technique to extend the partial products to 2p digits (due to shifting each new partial product by one digit to the left with respect to the previous partial product), the propagated internal carry is always correct. However, the final output carry from the CPA adder is generally not correct in most cases. To overcome this issue, the CSA tree unit (232) and the CPA unit (234) are configured to be 2p+1 digits where the LSB (least significant bit) of digit number 2p+1 from the CPA unit (234) is used as a carry out.

The 2 (in addition to p) extra partial products are (1) the fixed point addend (32) and (2) a tail digit vector that takes values:
(i) 00000000000000000000000000000000; when the effective operation is addition and the sign of the last partial product vector (p) is positive. (ii) 00000000000000000000000000000001; when the effective operation is addition and the sign of the last partial product vector (p) is negative.

40: E FFFFFFFF9F5C1C81 114CF89EE2BCB7BF; sum vector written in hexadecimal format in this disclosure to represent actual BCD-4221.

41: 2 0000000080E289F3 330A0EE29C808E00; carry vector written in hexadecimal format in this disclosure to represent actual BCD-4221.

The CSA tree unit (232) is a tree of 3:2 compressors and reduces the p+2 partial product vectors to the sum vector (40) and the carry vector (41) to be added through CPA (234).

42: 0000000000186234 4433034139172380

The aforementioned carry out is 1 indicating that the result is positive and does not need to be further complemented. Specifically, the carry out is used to decide if the result from the carry propagation adder (i.e., Konge-Stone base CPA (234)) needs to be complemented (in case of subtraction) or the most p digits of the addend (which is handled in parallel separate from the fixed-point FMA unit (222)) need to be incremented (in case of addition).

A variation of the example is described below to illustrate the use of 2p+1 digits configuration for the CSA tree unit (232) and CPA unit (234) for generating correct carry out from the CPA unit (234).

For 2p digit width in the CSA tree unit (232) and CPA unit (234) (p=16 for decimal64):

32: FFFFFFFF74C6055160705555FFFFFFFF; the addend after conversion to BCD-4221 and complementing by XORing its bits with the effective operation sign EOP.

40: EFFFFFFFF819F7A46B14296ADA1995E7; the sum vector out from the CSA tree unit (232), written in hexadecimal format in this disclosure to represent actual BCD-4221.

41: 20000000028E0EF829CFCF0A81CEEE20; the carry vector out from the CSA tree unit (232), in written hexadecimal format in this disclosure to represent actual BCD-4221.

42: 9999999966404567281945317844205; the result vector of 2p digits generated by the summation from the CPA unit (234) in BCD-8421 format. This carry out bit from the CPA unit (234) equals 1, which is incorrect. The correct carry out bit should be 0 (because the result of the subtraction needs to be nine's complement) to select the correct complemented result 00000000033595432718054682155794.

For 2p+1 digits width in the CSA tree unit (232) and CPA unit (234):

32: 0FFFFFFFF74C6055160705555FFFFFFFF; the addend after conversion to BCD-4221 and complementing by XORing its bits with the effective operation sign EOP.

40: EFFFFFFFFF819F7A46B14296ADA1995E7; the sum vector out from the CSA tree unit (232), written in hexadecimal format in this disclosure to represent actual BCD-4221.

41: 200000000028E0EF829CFCF0A81CEEE20; the carry vector out from the CSA tree unit (232), in written hexadecimal format in this disclosure to represent actual BCD-4221.

42: 09999999966404567281945317844205; the result vector of 2p+1 digits generated by the summation from the CPA unit (234) in BCD-8421 format. The carry out bit equals 1, which is incorrect.

To have the correct carry out bit, the least significant bit in the most digit of the CPA result (digit no. 2p+1 which equals 0) is used as carry out (it is 4-bit represents the digit in BCD-8421 format and its values always 0 (0000) or 1 (0001)). The result of the subtraction, which needs to be nine's complement, will be selected correctly by the correct carry out signal to give 00000000033595432718054682155794.

As is known by one skilled in the art, this invention, including any logic circuit or transistor circuit, may be modeled, generated, or both by a computer based on a description of the hardware expressed in the syntax and the semantics of a hardware description language (HDL). Such HDL descriptions are often stored on a computer readable medium. Applicable HDLs include those at the layout, circuit netlist, register transfer, and/or schematic capture levels. Examples of HDLs include, but are not limited to: GDS II and OASIS (layout level); various SPICE languages, and IBIS (circuit netlist level); Verilog and VHDL (register transfer level); and Virtuoso custom design language and Design Architecture-IC custom design language (schematic capture level). HDL descriptions may also be used for a variety of purposes, including but not limited to layout, behavior, logic and circuit design verification, modeling, and/or simulation.

The system(s) and processes described in this detailed description may be used in any application requiring decimal calculations, including (but not limited to) applications of: finance, taxation, investments, transportation, commerce, energy consumption, energy pricing/purchasing, etc.

Figure 4:
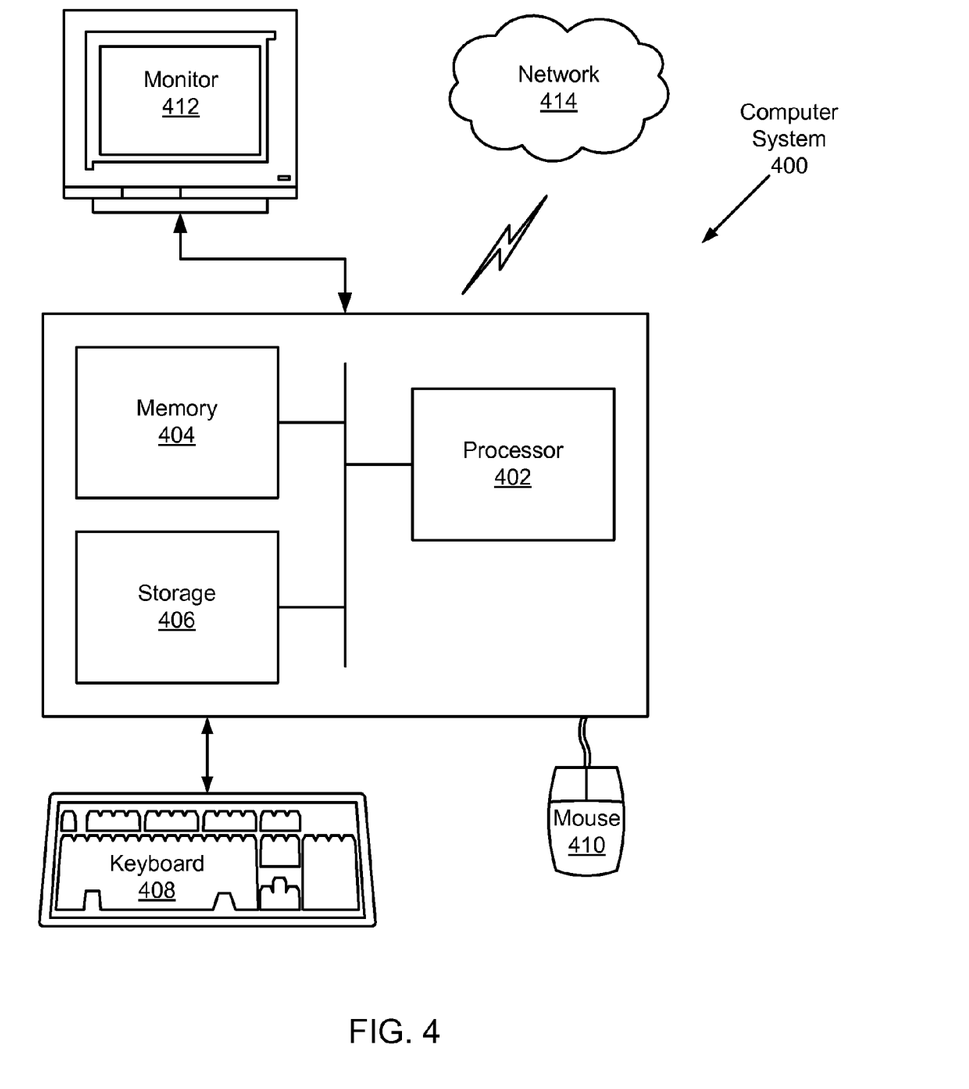
FIG. 4 shows a diagram of a computer in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various elements of the AAD platform (122), the repository (125), etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A circuit for performing decimal floating-point fused-multiply-add (FMA) calculation of ±A×B±C, comprising:
   a formulation unit configured to generate a multiplicand significand, a multiplicand exponent, a multiplier significand, a multiplier exponent, an addend significand, and an addend exponent by decoding a multiplicand, a multiplier, and an addend, respectively, according to a decimal floating-point format comprising a plurality of binary-coded-decimal (BCD) digits, wherein the multiplicand, the multiplier, and the addend are represented by A, B, and C, respectively;

a decimal FMA core coupled to the formulation unit and comprising:

a shifter configured to shift the addend significand based on the multiplicand exponent, the multiplier exponent, and the addend exponent to generate an aligned addend significand;

a partial product generator configured to generate a plurality of partial products from the multiplicand significand and the multiplier significand concurrently with generating the aligned addend significand; and an adder configured to generate an intermediate result significand by:

when ±A×B and ±C have a same sign indicating an addition: adding the plurality of partial products and the aligned addend significand; and when ±A×B and ±C have opposite signs indicating a subtraction: adding the plurality of partial products and a nine's complement of the aligned addend significand; and a result generator coupled to the decimal FMA core and configured to:

selectively increment the intermediate result significand to convert the nine's complement into a ten's complement when ±A×B and ±C have opposite signs; and generate a result of the FMA calculation based on the intermediate result significand.

2. The circuit of claim 1, wherein a portion of the aligned addend significand is in a BCD-4221 format, wherein the nine's complement of the aligned addend significand is generated by an XOR operation between the aligned addend significand and an effective operation (EOP) of the FMA calculation determined based on a first ± operator of the FMA calculation, a second ± operator of the FMA calculation, a sign of the multiplicand, a sign of the multiplier, and a sign of the addend, wherein the effective operation indicates one of the addition and the subtraction.

3. The circuit of claim 1, wherein the partial product generator is configured to generate the plurality of partial products by:

generating a plurality of multiples of the multiplicand significand;

converting the multiplier significand into a plurality of signed digits sets, wherein each of the plurality of signed digits sets is represented by a plurality of one-hot control signals; and generating each of the plurality of partial products by using the plurality of one-hot control signals to select one of the plurality of multiples.

4. The circuit of claim 2, wherein the plurality of partial products and the aligned addend significand are in a BCD-4221 format to be added using the adder, wherein the adder is a carry save adder tree and the intermediate result comprises a sum vector and a carry vector, wherein the partial product generator further comprises a carry propagation adder (CPA) configured to generate a non-redundant output by adding the sum vector and the carry vector, wherein the decimal floating-point format is based on p-digit precision, wherein the carry save adder tree and the carry propagation adder are configured with (2p+1)-digit precision, and wherein the CPA is configured to:

generate a carry output based on a least significant bit of a most significant digit of the non-redundant output of the CPA; and generate an incremented version of the non-redundant output, wherein the non-redundant output and the incremented version of the non-redundant output are used to convert the nine's complement into the ten's complement.

5. The circuit of claim 1, further comprising a master control unit coupled to the decimal FMA core and configured to:

determine a right/left shift amount based on the multiplier exponent, the multiplicand exponent, and the addend exponent, wherein the right/left shift amount is provided to the decimal FMA core for shifting the addend significand to align with the plurality of partial products;

determine a left shift amount based on a decimal point position and leading zero digits of the intermediate result significand, wherein the left shift amount is provided to the decimal FMA core for shifting the intermediate result significand;

determine a number of digits for generating a sticky bit to account for lost of precision as a result of an operand shifting operation;

determine an effective operation (EOP) of the FMA calculation, wherein the EOP indicates one of the addition and the subtraction; and determine an exponent of the result of the FMA calculation based on the multiplier exponent, the multiplicand exponent, and the addend exponent.

6. The circuit of claim 1, wherein the result generator is further configured to encode the result significand and a result exponent into the floating-point format.

7. The circuit of claim 1, wherein the formulation unit is further configured to identify a special input combination comprising at least selected from a group consisting of Not-a-Number and Infinity in the multiplier, the multiplicand, and the addend, and wherein the circuit further comprises a special data generator configured to replace, in response to identifying the special input combination, the intermediate result by a value corresponding to the special input combination.

8. The circuit of claim 1, wherein the decimal FMA core is selectively configured to perform one of ±A×B±C, ±A×B, and ±A±C operations.

9. A method for performing floating-point fused-multiply-add (FMA) calculation of ±A×B±C, comprising:

generating, by a formulation circuit, a multiplicand significand, a multiplicand exponent, a multiplicand sign, a multiplier significand, a multiplier exponent, a multiplier sign, an addend significand, an addend exponent, and an addend sign by decoding a multiplicand, a multiplier, and an addend, respectively, according to a decimal floating-point format comprising a plurality of binary-coded-decimal (BCD) digits, wherein the multiplicand, the multiplier, and the addend are represented by A, B, and C, respectively;

shifting, by a shifter circuit, the addend significand based on the multiplicand exponent, the multiplier exponent, and the addend exponent to generate an aligned addend significand;

generating, by a partial product generator circuit, a plurality of partial products from the multiplicand significand and the multiplier significand concurrently with generating the aligned addend significand;

generating, by an adder circuit, an intermediate result significand by:
when ±A×B and ±C have a same sign indicating an addition: adding the plurality of partial products and the aligned addend significand; and
when ±A×B and ±C have opposite signs indicating a subtraction: adding the plurality of partial products and a nine's complement of the aligned addend significand;
selectively incrementing, by a result generator circuit, the intermediate result significand to convert the nine's complement into a ten's complement when ±A×B and ±C have opposite signs; and
generating, by the result generator circuit, a result of the FMA calculation based on the intermediate result significand.

10. The method of claim 9,
wherein the aligned addend significand is in a BCD-4221 format,
wherein the nine's complement of the aligned addend significand is generated by an XOR operation between the aligned addend significand and an effective operation (EOP) of the FMA calculation determined based on a first ± operator of the FMA calculation, a second ± operator of the FMA calculation, a sign of the multiplicand, a sign of the multiplier, and a sign of the addend, wherein the effective operation indicates one of the addition and the subtraction.

11. The method of claim 9, wherein generating the plurality of partial products comprises:
generating a plurality of multiples of the multiplicand significand;
converting the multiplier significand into a plurality of signed digits sets, wherein each of the plurality of signed digits sets is represented by a plurality of one-hot control signals; and
generating each of the plurality of partial products by using the plurality of one-hot control signals to select one of the plurality of multiples.

12. The method of claim 9,
wherein the plurality of partial products and the aligned addend significand are in a BCD-4221 format to be added using the adder,
wherein the adder circuit is a carry save adder tree and the intermediate result comprises a sum vector and a carry vector,
wherein the partial product generator circuit further comprises a carry propagation adder (CPA) configured to generate a non-redundant output by adding the sum vector and the carry vector,
wherein the decimal floating-point format is based on p-digit precision,
wherein the carry save adder tree and the carry propagation adder are configured with (2p+1)-digit precision, and
wherein the CPA is configured to generate a carry output based on a least significant bit of a most significant digit of the non-redundant output of the carry propagation adder.

13. The method of claim 9, further comprising:
determining a right/left shift amount based on the multiplier exponent, the multiplicand exponent, and the addend exponent, wherein the right/left shift amount is provided to the decimal FMA core for shifting the addend significand to align with the plurality of partial products;
determining a left shift amount based on a decimal point position and leading zero digits of the intermediate result significand, wherein the left shift amount is provided to the decimal FMA core for shifting the intermediate result significand;
determining a number of digits for generating a sticky bit to account for lost of precision as a result of an operand shifting operation;
determining an effective operation (EOP) of the FMA calculation, wherein the EOP indicates one of the addition and the subtraction; and
determining an exponent of the result of the FMA calculation based on the multiplier exponent, the multiplicand exponent, and the addend exponent.

14. The method of claim 9, further comprising encoding the result significand and a result exponent into the floating-point format.

15. The method of claim 9, further comprising:
identifying a special input combination comprising at least selected from a group consisting of Not-a-Number and Infinity in the multiplier, the multiplicand, and the addend; and
replacing, in response to identifying the special input combination, the intermediate result by a value corresponding to the special input combination.

16. A non-transitory computer-readable medium storing a description expressed in a hardware description language which is interpreted by a computer to specify a circuit, comprising:
a formulation unit configured to generate a multiplicand significand, a multiplicand exponent, a multiplier significand, a multiplier exponent, an addend significand, and an addend exponent by decoding a multiplicand, a multiplier, and an addend, respectively, according to a decimal floating-point format comprising a plurality of binary-coded-decimal (BCD) digits, wherein the multiplicand, the multiplier, and the addend are represented by A, B, and C, respectively;
a decimal FMA core coupled to the formulation unit and comprising:
a shifter configured to shift the addend significand based on the multiplicand exponent, the multiplier exponent, and the addend exponent to generate an aligned addend significand;
a partial product generator configured to generate a plurality of partial products from the multiplicand significand and the multiplier significand concurrently with generating the aligned addend significand; and
an adder configured to generate an intermediate result significand by:
when ±A×B and ±C have a same sign indicating an addition: adding the plurality of partial products and the aligned addend significand; and
when ±A×B and ±C have opposite signs indicating a subtraction: adding the plurality of partial products and a nine's complement of the aligned addend significand; and
a result generator coupled to the decimal FMA core and configured to:
selectively increment the intermediate result significand to convert the nine's complement into a ten's complement when ±A×B and ±C have opposite signs; and
generate a result of the FMA calculation based on the intermediate result significand.

17. The non-transitory computer-readable medium of claim 16,
wherein a portion of the aligned addend significand is in a BCD-4221 format, wherein the nine's complement of the aligned addend significand is generated by an XOR operation between the aligned addend significand and an effective operation (EOP) of the FMA calculation determined based on a first ± operator of the FMA calculation, a second ± operator of the FMA calculation, a sign of the multiplicand, a sign of the multiplier, and a sign of the addend, wherein the effective operation indicates one of the addition and the subtraction.

18. The non-transitory computer-readable medium of claim 16, wherein the partial product generator is configured to generate the plurality of partial products by:
   generating a plurality of multiples of the multiplicand significand;
   converting the multiplier significand into a plurality of signed digits sets, wherein each of the plurality of signed digits sets is represented by a plurality of one-hot control signals; and
   generating each of the plurality of partial products by using the plurality of one-hot control signals to select one of the plurality of multiples.

19. The non-transitory computer-readable medium of claim 17,
   wherein the plurality of partial products and the aligned addend significand are in a BCD-4221 format to be added using the adder,
   wherein the adder is a carry save adder tree and the intermediate result comprises a sum vector and a carry vector,
   wherein the partial product generator further comprises a carry propagation adder (CPA) configured to generate a non-redundant output by adding the sum vector and the carry vector,
   wherein the decimal floating-point format is based on p-digit precision, wherein the carry save adder tree and the carry propagation adder are configured with (2p+1)-digit precision, and
   wherein the CPA is configured to:
      generate a carry output based on a least significant bit of a most significant digit of the non-redundant output of the CPA; and
      generate an incremented version of the non-redundant output, wherein the non-redundant output and the incremented version of the non-redundant output are used to convert the nine's complement into the ten's complement.

20. The non-transitory computer-readable medium of claim 16, further comprising a master control unit coupled to the decimal FMA core and configured to:
   determine a right/left shift amount based on the multiplier exponent, the multiplicand exponent, and the addend exponent, wherein the right/left shift amount is provided to the decimal FMA core for shifting the addend significand to align with the plurality of partial products;
   determine a left shift amount based on a decimal point position and leading zero digits of the intermediate result significand, wherein the left shift amount is provided to the decimal FMA core for shifting the intermediate result significand;
   determine a number of digits for generating a sticky bit to account for lost of precision as a result of an operand shifting operation;
   determine an effective operation (EOP) of the FMA calculation, wherein the EOP indicates one of the addition and the subtraction; and
   determine an exponent of the result of the FMA calculation based on the multiplier exponent, the multiplicand exponent, and the addend exponent.

* * * * *